United States Patent [19]

Kakolewski

[11] Patent Number: 5,464,638

[45] Date of Patent: Nov. 7, 1995

[54] PERFUSION AIDED MEAT PROCESSING

[76] Inventor: Jan W. Kakolewski, 324 E. Hawthorne, Minden, Nebr. 68959

[21] Appl. No.: 378,536

[22] Filed: Jan. 26, 1995

Related U.S. Application Data

[63] Continuation-in-part of Ser. No. 184,219, Jan. 18, 1994, abandoned, which is a continuation-in-part of Ser. No. 958,071, Oct. 7, 1992, abandoned, which is a continuation-in-part of Ser. No. 733,437, Aug. 26, 1991, abandoned.

[51] Int. Cl.$^6$ .............................. A23L 1/314; A23L 1/318
[52] U.S. Cl. .................. 426/2; 426/281; 426/641
[58] Field of Search .................. 426/2, 281, 641, 426/650

[56] References Cited

U.S. PATENT DOCUMENTS

| | | | |
|---|---|---|---|
| 2,767,096 | 10/1956 | Schotte | 426/281 |
| 3,042,529 | 7/1962 | Radouco-Thomas | 426/602 |
| 3,122,440 | 2/1964 | Williams | 426/2 |
| 3,511,164 | 5/1970 | Strandine et al. | 426/281 X |
| 3,818,106 | 6/1974 | Kang et al. | 426/2 |
| 4,016,292 | 4/1977 | Hood | 426/2 |

FOREIGN PATENT DOCUMENTS

| | | | |
|---|---|---|---|
| 1042708 | 9/1977 | Canada | 426/281 |
| 8806003 | 8/1908 | WIPO | 426/281 |

*Primary Examiner*—Arthur L. Corbin
*Attorney, Agent, or Firm*—John A. Beehner

[57] ABSTRACT

A process for tenderizing, flavoring, cholesterol or sodium extracting or fat binding of meat through perfusion includes the steps of inducing the brain death of a meat-providing animal and leaving the meat-providing animal substantially intact. The circulatory system is accessed and a perfusion fluid generally free of melted fats is injected into the arterial side of the circulatory system of the animal under moderate pressure. Blood and fluid are removed from the circulatory system through a separate vein such as the jugular, thus cleansing the circulatory system of the animal, which acts to flavor or tenderize the meat therein. The perfusion fluid is heated to at least 80° F. (26.7° C.) before infusion. The final result is meat that is unchanged in appearance, but improved in taste, texture and tenderness.

20 Claims, 4 Drawing Sheets

PERFUSION AIDED MEAT PROCESSING

CROSS REFERENCE TO RELATED APPLICATION

This is a continuation-in-part of patent application Ser. No. 08/184,219 filed on Jan. 18, 1994, now abandoned, which is a continuation-in-part of Ser. No. 07/958,071 filed on Oct. 7, 1992, now abandoned, which is a continuation-in-part of Ser. No. 07/733,437, filed on Aug. 26, 1991, now abandoned.

BACKGROUND OF THE INVENTION

1. Technical Field

This invention relates to perfusion aided meat processing and, more particularly, to a process for tenderizing, flavoring, or cholesterol, sodium or fat extraction in a recently slaughtered meat providing animal through a fluid perfusion process.

2. Description of the Prior Art

Various processes are known for injecting meat-producing animals with chemicals to produce various desired results. For example, Hood, U.S. Pat. No. 4,016,293, discloses a process for improving the color stability of fresh meat by parenterally administering a massive dose of an ascorbate to the animal, allowing distribution of the ascorbate through the vascular system of the animal and then slaughtering the animal. Likewise, Kang et al., U.S. Pat. No. 3,818,106, discloses a process of tenderizing meats by injecting an enzyme into an animal's vascular system while the animal is alive, wherein the enzyme is reactivated at a controlled rate by naturally occurring reducing agents present in the animal's blood.

Neither of these inventions, however, addresses the major problem encountered in perfusion aided processing. The problem is that once an animal is injected, the animal must be held alive for a time sufficient to obtain uniform distribution of the chemical administered throughout the animal system. Of course, obtaining uniform distribution of the chemical in this manner is frequently impossible due to the nature of the animal's circulatory system. This results in undesirable delays in processing and quality changes of the meat. Furthermore, as mentioned in Kang, U.S. Pat. No. 3,818,106, injection of many commercially available enzymes into a live animal often causes internal hemorrhaging and edema of the internal organs. For this reason, various specialized enzymes have been developed to attempt to avoid these undesirable side effects, but these modified enzymes may not be easily obtainable by meat processors around the world or completely avoid the undesirable side effects of the alive treatments.

Furthermore, injection of an animal weighing up to 1,000 pounds can and sometimes does result in the animal reacting violently to the injection, which may cause injury and/or damage to persons or property nearby. The injected animal may also inflict injury to itself, which may cause damage to some of the meat which the animal will produce.

All of the above mentioned problems could be easily solved if a process were known which would allow perfusion of chemicals into an animal's circulatory system following the slaughtering of the animal. There is at present, however, no such process. There is therefore a need for such a process.

Several examples of postmortem perfusion processes are found in the prior art, such as Bernhardt et al., W088/06003 and Schotte, U.S. Pat. No. 2,767,096. While the methods of Bernhardt and Schotte may be used for postmortem perfusion of chemicals into an animal's circulatory system, both Bernhardt and Schotte require substantial modification to the slaughtered animal in order to properly administer the perfusion fluids. For example, the process described in Bernhardt involves using a slaughtered animal which has portions of the limbs thereof removed to allow for drainage of the perfusion of fluid from the legs. Schotte teaches an even more extreme modification of the slaughtered animal before perfusion can begin. In Schotte, the description of the pre-perfusion preparation of the animal for arterial injection procedure covers almost three entire columns in the Schotte patent. Some of the steps which are included are the severance of the head, separation of the pulmonary artery from the aorta, removal of the trachea, esophagus and of the lungs, removal of a portion of the rectum-colon and emptying of the entire abdominal cavity. During each of these steps, special care must be taken to prevent damage to arteries and veins within the cavities, and in fact some severed arteries and veins must be clamped to prevent fluid flow therethrough. It is clear that the methods of both Bernhardt et al. and Schotte involve extensive preparation of the animal carcass before beginning perfusion, which substantially increases the time needed to perfuse the carcass. There is therefore a need for a perfusion process which may be administered to a slaughtered animal almost immediately after slaughtering of the animal and without requiring substantial modification of the animal carcass before beginning the perfusion process.

Therefore, an object of the present invention is to provide a process for post-mortem injection of a meat-producing animal.

Another object of the present invention is to provide a process which may tenderize, flavor, or cholesterol or fat bind and/or extract from meat or remove sodium through perfusion of substances into and through a meat-providing animal.

Yet another object of the present invention is to provide a process for perfusing meat which will not change the appearance of meat.

Still another object of the present invention is to provide a process for perfusing meat which may be easily implemented in any meat processing plant.

Another object of the present invention is to provide a process for perfusing meat which includes the step of heating the perfusion fluid to approximately the body temperature of the animal before introducing the fluid into the animal.

Another object of the present invention is to provide a process for perfusing meat which does not require substantial modification of the slaughtered animal and, in fact, teaches away from severing of limbs or removal of viscera as time-consuming and unnecessary.

Finally, an object of the present invention is to provide a process for tenderizing, flavoring, cholesterol or sodium extracting or fat binding of meat through perfusion which is inexpensive, cost effective and adds little time to the processing procedures.

SUMMARY OF THE INVENTION

The present invention provides a process for tenderizing, flavoring, cholesterol or sodium extracting or fat binding of meat through perfusion which includes the steps of inducing the brain death of a meat-providing animal and leaving the meat-providing animal generally intact, particularly not removing any viscera or limbs from the animal. The circulatory system of the animal is then accessed and the perfusion fluid, after being heated to a temperature of at least 80° F., is introduced into the circulatory system of the animal. The fluid is circulated through the circulatory system of the animal, thus replacing at least some of the blood of the animal with the perfusion fluid. The blood and perfusion fluid are then drained from the circulatory system of the animal from fewer than three exit points in the circulatory system of the animal.

Various perfusion fluids may be used, including flavorings such as pineapple or garlic solutions, or simple isotonic solutions such as a salt or glucose solution which may be used to induce tenderization of the meat. In this manner, whatever the desired end product of the process (i.e., tenderizing, flavoring, cholesterol or sodium extraction or fat binding), it may be easily and quickly accomplished, without causing damage to the meat being processed as may occur when using other methods disclosed in the prior art. Furthermore, as the process of the present invention may be integrated into the meat processing process itself, very little delay is engendered in utilization of this process. The opportunity for delay is further reduced as the process of the present invention requires little or no modification of the animal carcass before beginning the perfusion process.

It has been my further findings that the results of the perfusion aided meat processing of the present invention include the following:

(1) The meat is generally free of blood-borne active (enzymes) and passive (waste products, cholesterol and fat) elements;

(2) The meat is tender and the degree of tenderness can be controlled;

(3) The appearance is fresh and appealing;

(4) The meat is free of animal-specific odors;

(5) The palatability can be controlled;

(6) The meat is free of contamination;

(7) The meat may be stored for at least twice as long as unprocessed meat;

(8) Texture and marbling of the meat is unaffected, however, the juiciness of the meat is increased;

(9) Even over extended periods of time, there is no "green" spoiled appearance formed on the meat; and

(10) A wide variety of desired tastes and odors can be inserted into the meat product.

The present invention thus provides a substantial improvement over the prior art.

DESCRIPTION OF THE PREFERRED EMBODIMENT

Figure 1:
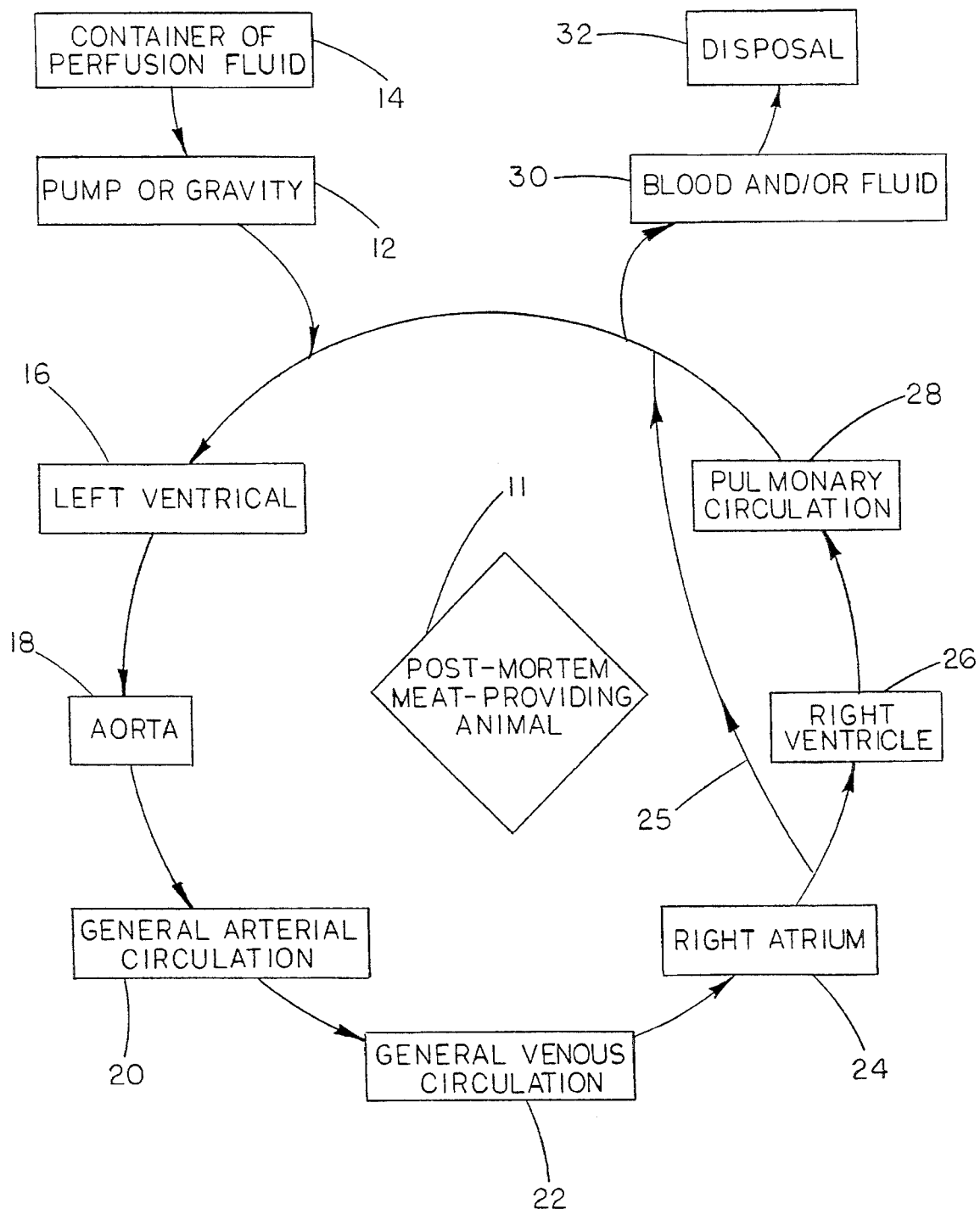
FIG. 1 is a fluid flow diagram exhibiting the process of the present invention.

The perfusion aided meat processing 10 of the present invention is illustrated in FIG. 1 by a fluid flow diagram.

Figure 2:
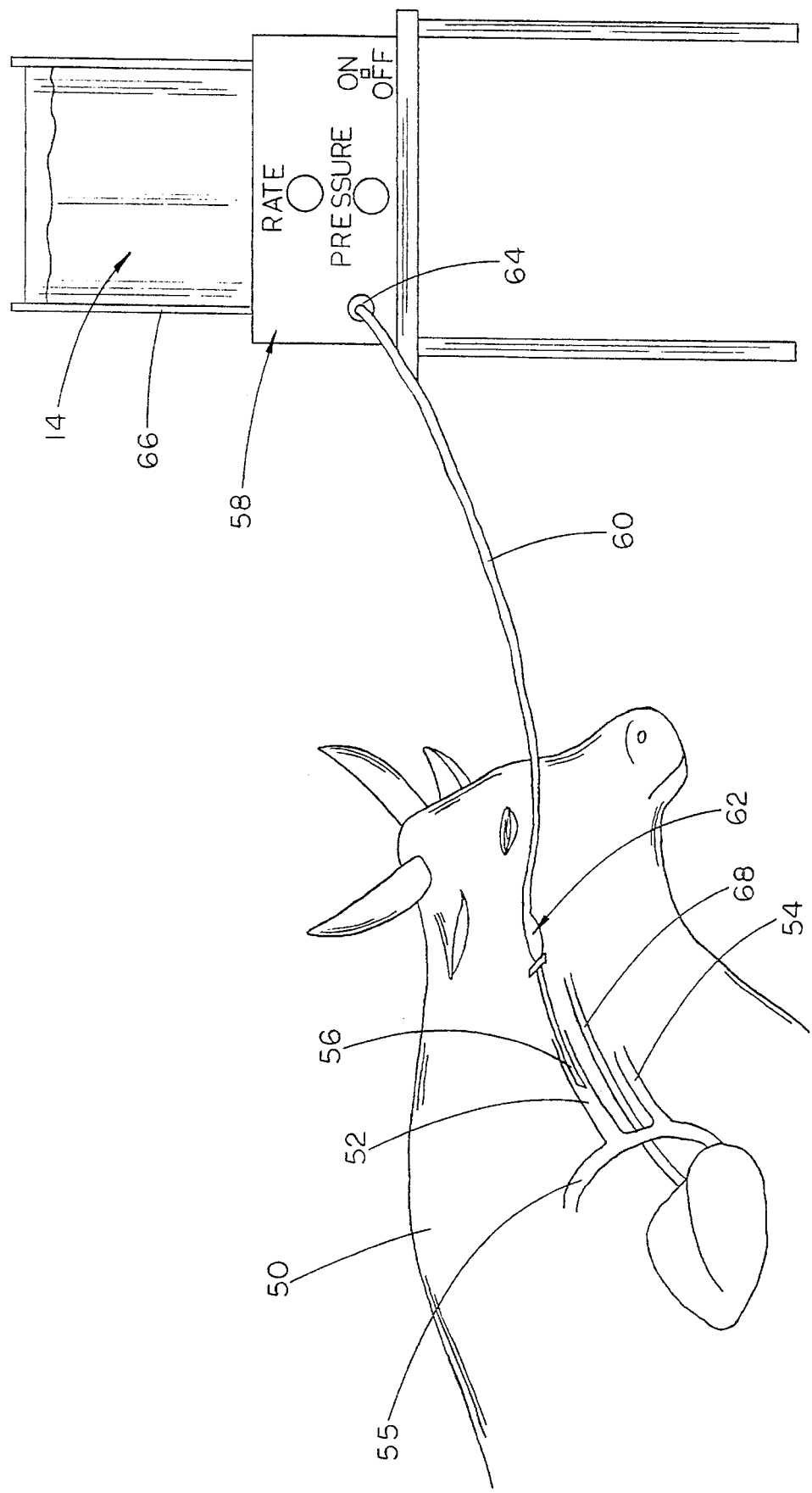
FIG. 2 is a side elevational view of the process of the present invention being performed on a meat-providing animal.
Figure 3:
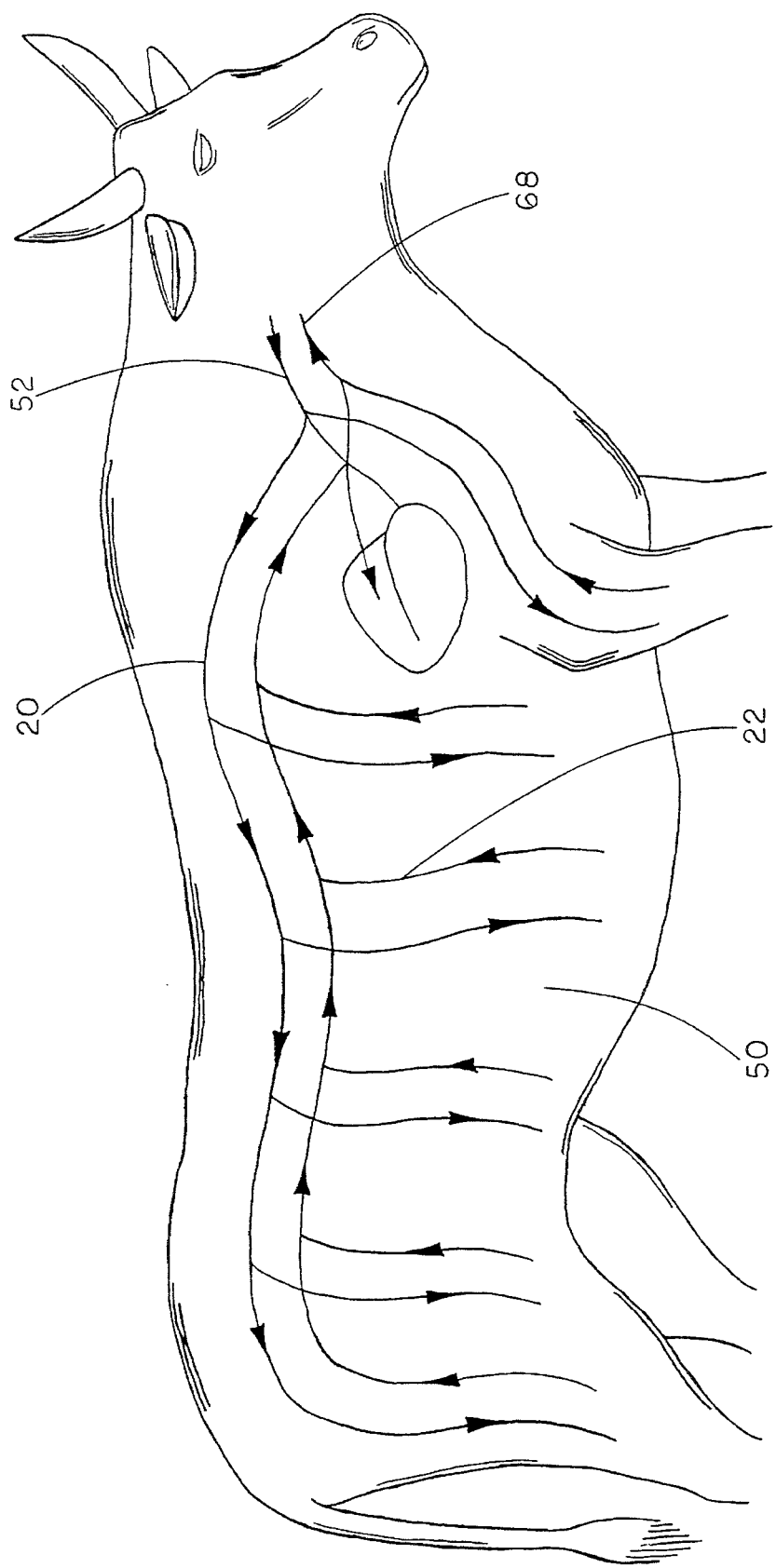
FIG. 3 is a side sectional diagrammatical view of the circulatory system of a steer showing areas perfused by the present invention.

As an example of the process of the present invention, I will illustrate the procedure performed on a steer 50, as shown in FIGS. 2 and 3. After the usual cleaning before slaughter, brain death is induced either by discharging a bullet into the brain or passing electrical current through the brain. Both of these ways are accepted as proper and humane.

In the present example, the steer 50 weighs approximately 1,400 pounds. The carcass is then placed on its side on an inclined table surface, with the head portion of the carcass elevated above the hind quarters to facilitate the perfusion process. The neck 51 is cleansed and opened. It is preferred that both carotid arteries 52 and 54 be exposed with one carotid artery 54 being ligated and the other 52 being cannulated with an intra-arterial stainless steel cannula 56. It is preferred that only a single carotid artery be accessed, thereby creating only a single access point to the circulatory system.

A perfusion apparatus 58, in the preferred embodiment, consists of a fluid-conducting tube 60 having a cannula-connecting end 62 and an opposite end 64 which is connected to a pump 12, Connected to the pump by similar tubing is a container 66 of perfusion fluid 14. Alternatively, the container 66 of perfusion fluid 14 may be connected directly to the fluid-conducting tube. The hydrostatic or mechanical pressure necessary for preparation of the process of the present invention would then be supplied by a raising the container 66 of perfusion fluid 14 above the carcass, thus allowing the force of gravity to act as a type of pump. An alternative is to use a mechanical pump with regulated perfusion pressure as shown in FIG. 2. To provide proper hydrostatic pressure for the process of the present invention, it is preferred that the container 66 of perfusion fluid 14, when used without a pump, have a minimum weight of fluid of 1/13 of the animal's body weight. It is further preferred that the perfusion fluid be injected into the carcass at a pressure of approximately 3–10 psi, with a preferred range being between 5 and 8 psi. It is believed that this pressure level will provide optimal perfusion results while preventing bursting of small blood vessels which cannot accommodate higher flow pressures.

As stated previously, the cannula 56 is introduced into the carotid artery 52 of the steer 50 through the incision made in the neck area 51. For improved results in perfusion, the cannula 56 may be inserted into the carotid artery 52 and extended downward through the neck 51 until the end of the cannula 56 enters the aorta 55. It is important to note that if perfusion were initiated into veins, especially at the pressure necessary to push the fluid through the circulatory system, pulmonary circulation would be discharged by the lungs and there would be little or no filling of arterial capillary vessels. On the other hand, use of arterial entry into animals with cut-off appendages, be it legs or head, leaves the artery-vein loop only partially available and thus tissue perfusion would be at best marginal. The present invention is therefore design primarily for use with complete carcasses which would include intact circulatory systems to provide optimum perfusion results. Complete carcasses should be understood to mean that the viscera and limbs of the animal are intact and left included in the carcass. Perfusion by the process of the present invention thus results in perfusion of the viscera as well as the rest of the carcass, including such edible portions of the animal as the intestines, liver, stomach and kidneys.

Figure 4:
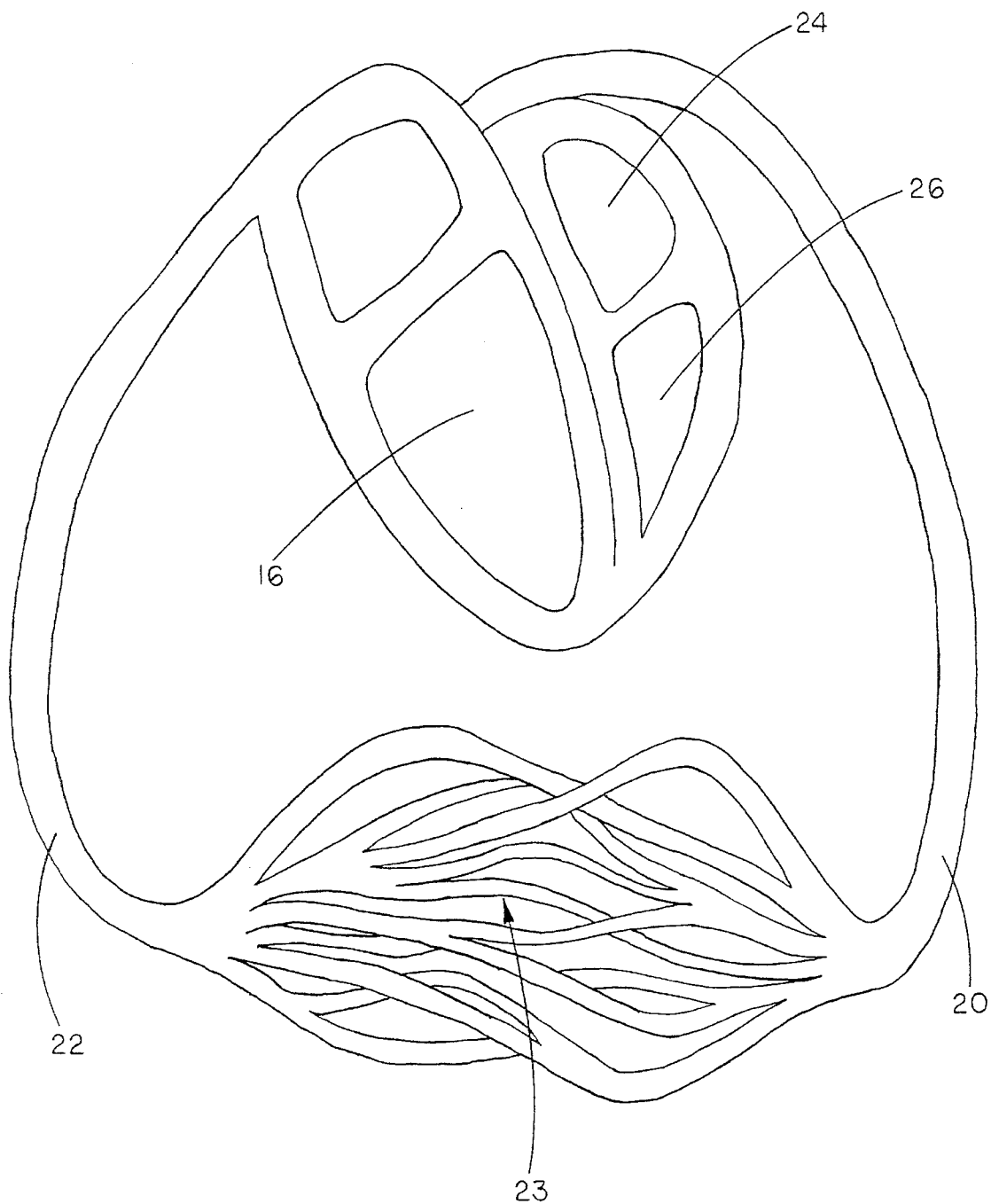
FIG. 4 is a diagrammatical view of a circulatory system showing where the perfusion process of the present invention takes place within the animal.

Before forcing fluids through the fluid-conducting tube into the aorta, the perfusion fluid is preferably heated to approximately equal the body temperature of the animal. The perfusion fluid temperature would preferably be between 80° and 120° F., with the optimum temperature being 90° and 105° F. Use of perfusion fluid at lower temperatures results in the intima or endothelium (the internal membrane of blood vessels) closing and preventing flow in the small capillary circulation. It is in the capillaries that transfer of the perfusion fluid into the surrounding cells takes place as shown in FIG. 4, and therefore this part of the circulation is most important for optimal perfusion. Cold fluid may be circulated for purposes of rapid cooling of the carcass, but it has been found that cold fluid does not perfuse into tissue nearly as well as heated fluid. Heating of the perfusion fluid is therefore an important step in the method of the present invention.

According to various tests I have conducted, I have found that perfusion in the higher ranges of the temperature scale described above results in a significant decrease in the time of perfusion but does not substantially increase the consistency of the pink or cured color which results from the perfusion process. I have further discovered that the perfusion results obtained by using fluids having lower temperatures cannot be overcome by increasing the pressure of perfusion, which instead results in the small blood vessels (i.e., capillaries) becoming fractured and obstructed. Accumulation of fluid in the vascular bed thus increases and the outflow from the carcass is unpredictable. It is further expected that perfusion at temperatures up to and exceeding 150° F. will result in a degree of pre-cooking of the meat and organs, in addition to perfusion of the tissues, which may be a desirable feature.

Following heating of the perfusion fluid, the fluid is then forced into the carotid artery 52 and/or aorta 55 which forces fluid through the animals arterial circulation 20. The fluid then flows through multitudinous capillaries 23 which connect the arterial and venous circulation 20 and 22. It is in the capillaries, as discussed previously and as shown in FIG. 4, that to a great extent the perfusion process takes place. After the fluid flows through the capillaries into the animal's venous circulation 22, it is clear that at least one exit point must be made in the circulatory system to allow for release of blood and fluid from the system. In the preferred embodiment, the exit point from the circulatory system is from one or both of the jugular veins 68. An incision is made in the neck of the animal above at least one of the jugular veins 68, the incision extending into and through the jugular vein to provide an exit from the circulatory system for the blood and fluid being circulated through the system.

It is important to note that by forming the exit point from the circulatory system in the jugular vein 68, the pulmonary circulation system 28 is avoided, thus preventing unnecessary loss of fluid within the lungs of the animal. It is also important to note that it is preferred that the circulatory system be opened at only one carotid artery 52 and opened at only one jugular vein 68, thus providing only a single entry point and single exit point. If the circulatory system is open at more than one artery for entry and more than one vein for exit, the results of the process are unpredictable, as perfusion fluid may not reach and penetrate each capillary system along the circulatory route. By providing only a single exit point, the resistance within the circulatory system to fluid flow therethrough remains substantially the same as it was before the animal's death, thus resulting in more efficient perfusion of perfusion fluid 14 into the tissues surrounding the capillaries. When the perfusion is attempted in animals with a plurality of exit points, the perfusion fluid 14 attempts to follow the path of lowest resistance to flow, and therefore will avoid many sections of capillary flow within the circulatory system in flowing into the exit point providing the least resistance to flow.

On the average, one cycle of the perfusion fluid is sufficient to wash out all the blood 30 from the carcass and leave enough residue to accomplish any of the desired effects such as washing out the blood 30, lowering the pH to tenderize, leaving sufficient taste for flavoring, securing enough brine for instant pickling or replacing sodium with an isotonic glucose solution.

Depending on the size of the animal 11 on which the process is to be performed, the entire procedure will take between 5 and 60 minutes to complete. In the steer 50 example stated above, perfusion took approximately one hour, although this was due in part to restrictions on the amount of fluid flow through the carcass. It is believed that substitution of large-diameter tubing for the small-diameter tubing used will reduce the elapsed perfusion time to approximately 20 minutes. It is preferred that the perfusion fluid flow through the steer 50 at approximately 3 liters/ minute, although the fluid flow may be adjusted depending upon the resistance encountered within the animal and amount of perfusion desired.

Finally, it is preferred that substantially all of the blood and fluid be drained from the opened jugular vein 68, thus leaving the carcass perfused and drained of blood and fluid. Of course, some of the perfusion fluid 14 will remain in the animal due to the perfusion process, and it is expected that approximately 1/30 of the perfusion fluid 14 circulated through the animal will be retained in the carcass. Of course, the amount of fluid remaining in the carcass will vary depending upon both temperature and pressure of the fluid as it passes through the carcass.

As an alternative example of the process of the present invention, I will illustrate the procedure performed on a pig, but any meat-producing animal such as cattle, fowl, deer or other such animals may be used. The sample pig weighs 200 lbs. After the usual cleaning before slaughter, brain death is induced either by discharging a bullet into the brain or passing electrical current through the brain. Both of these ways are accepted as proper and humane. Brain death does not cause the heart to stop beating and the blood continues to circulate through the entire body, except the skull area.

The carcass is positioned on its back in the work area. The upper extremities need to be tied down to clear the chest area. The left chest is cleaned and shaved. A sharp instrument is used to open the chest by cutting the intracoastal muscles in the IV–V intracoastal spaces, between the sternum and the anterior aspect of the axillary line. A standard rib retractor is used with the edges spread apart two to three inches. Access is thus gained to the left chest and thus the pericardium may be seen. Cutting through this will access the heart. Palpation enables the operator to tell which is the right side 24 and 26 or left side 16 of the heart. The right side 24 and 26 is thin-walled and the left side 16 is thick-walled. The carcass is now ready for the perfusion to take place.

The perfusion apparatus, in this embodiment, consists of a fluid conducting tube having a penetrating end and an opposite end which is connected to a pump, similar to the apparatus that was discussed previously. Connected to the pump by similar tubing is a container of perfusion fluid. Alternatively, the container of perfusion fluid may be connected directly to a tube having a penetrating end. The hydrostatic or mechanical pressure necessary for proper operation of the process of the present invention would then be supplied by raising the container of perfusion fluid above the carcass, thus allowing the force of gravity to act as a type of pump. An alternative is to use a mechanical pump with regulated perfusion pressure. To provide proper hydrostatic pressure for the process of the present invention, it is preferred that the container of perfusion fluid, when used without a pump, have a minimum weight of fluid of approximately 1/13 of the animal's body weight.

The penetrating end of the fluid conducting tube is then introduced into the arterial side of the circulatory system. For optimal results in perfusion, the insertion of the tube is preferably into a major artery such as the carotid or the aorta, or into the heart, specifically the thick wall or left side of the heart which is called the left ventricle 16. In general, however, advancing into the aorta 18 is preferable. The tip of the plastic tube is usually firm enough to penetrate the wall, however, a scalpel may alternatively be used. If perfusion were initiated into veins, especially with pressures necessary to fill out the low resistance, pulmonary circulation would be discharged by the lungs and there would be little or no filling of arterial capillary vessels. The present invention is designed primarily for use with complete carcasses which would include intact circulatory systems to provide optimal perfusion results. If the circulatory system is open at more than one artery for entry and more than one vein for exit, the results of the process are unpredictable, as perfusion fluid may not reach and penetrate each capillary system along the circulatory route.

Before forcing fluid through the fluid conducting tube into the left ventricle 16, the perfusion fluid is preferably heated to approximately equal the body temperature of the animal. The perfusion fluid temperature would preferably be between 80° and 120° F., with the optimum temperature being between 90° and 105° F. Use of perfusion fluid at lower temperatures results in the intima or endothelium (the internal membrane of blood vessels) closing and preventing flow in the small capillary circulation. It is in the capillary that transfer of the perfusion fluid into the surrounding cells takes place, and therefore this part of the circulation is most important for optimal perfusion. Cold fluid may be circulated for purposes of rapid cooling of the carcass, but it has been found that cold fluid does not perfuse into tissue nearly as well as heated fluid. Heating of the perfusion fluid is therefore an important step in the method of the present invention.

Following heating of the perfusion fluid, the fluid is then forced into the left ventricle 16 or aorta 18 which forces fluid through the animal's arterial circulation 20. As the fluid flows through the animal's venous circulation 22 towards the right atrium 24, the right atrium 24 is cut to release the animal's blood, followed by the perfusion fluid. As can be seen, the thus described embodiment does not circulate perfusion fluid through the pulmonary arteries and veins 28, instead following the flow arrow 25, as in most cases this will be an unnecessary use of fluid. In cases where the lungs of the animal may be eaten, the entire cycle of fluid including the right ventricle 26, as shown in FIG. 1, may be used.

On the average, one cycle of the perfusion fluid is sufficient to wash out all of the blood from the carcass and leave enough residue to accomplish any of the desired effects such as washing out the blood, lowering the pH to tenderize, leaving sufficient taste for flavoring, securing enough brine for instant pickling, or replacing sodium with an isotonic glucose solution.

Depending on the size of the animal on which the process is to be performed, the entire procedure will take between 5 and 60 minutes to complete. The animal is now ready for continued processing in the usual manner with approximately 1/30 of the perfusion fluid retained in the carcass.

The following provides a description of the preferred perfusion solutions to be used in the process of the present invention.

There are two basic working solutions: 0.9% NaCl or 5% glucose. They can be used separately or in a mixture. They are used as a "flush out" perfusent, solvent or diluent to any other mixtures or solutions used. Of importance is the fact that their pH is in the acidic range, a property that promotes tenderization. Also, perfusion with the glucose solution depletes the animal of the majority of the sodium remaining in the animal's circulatory system. The following are specific examples of solutions used for the perfusion aided meat process.

1. A pickling extract that is derived from existing commercial mixtures where 3 ounces of herbs are treated with equal parts of 100 cc of boiling water and 100 cc of cold water. This basic solution can be used at a non-diluted strength or at a diluted strength using 0.9% NaCl or 5% glucose. Pickling extract can be also mixed with 15 grams of tenderizer to one pound of meat using a commercially available tenderizer such as "Morton's Tender Quick".

2. Vitamin C up to 5% concentration can be used as an additive for pH adjustment to <5. Also, vitamin C is a color preservative, and vitamin C in this concentration does not cause any chemical degradation or pharmacological effects.

3. Barbecue smoke flavoring can be added in a threshold 10 grams to one kilogram or stronger to either a preparation as in #1 or just specifically and purely as a barbecue flavor only.

4. Mint flavor, especially to lamb meat, can be added to the perfusion by 1 gram of mint extract in 2 quarts of any basic perfusion solution.

5. Fresh garlic or onion can be perfused with the basic fluids. It can be added to any of the solutions if this taste is desired.

6. Beef bullion in an isotonic solution produces the beef "au jus" taste. Hypertonic bullion solutions produce stronger taste proper for sandwich slices.

7. A basic solution sukiyaki made with brown sugar saturated with soy sauce and garlic is prepared 24 hours prior to use. The stock is used in different proportions. A strong diluent or sukiyaki taste requires a ratio of one quart on the basic solution to 5 quarts of diluent. A more moderate taste can be accomplished by using the basic solution in a 1–12 ratio.

Further examples include apple cider, grape, papaya, mango, grapefruit, apricot, gooseberry, orange, vegetable juices and even wine in the available commercial concentrations or dilutions. Special "sauerbraten" perfusent can be composed.

Yet another embodiment of the present invention contemplates using a pasteurization variant. With this technique the temperature of the perfusion fluid is increased to 160°–170° F. for 15–20 seconds, then rapidly cooled to approximately 90° F. This process provides the advantages of partial sterilization and/or adds to the degree of meat tenderization. In the pasteurization process a gravy type perfusent can be used, thus giving the entire process a fast and finished product. Besides this technical expediency and superior quality, the time saved in meat processing is enormous.

However, no matter what type of perfusion fluid is to be used with the method of the present invention, it is important that the physiological osmolality of the perfusion solution be at least iso-osmotic with the osmolality of the animal's blood. The standard recognized figure for animal blood osmolality is approximately 276–282 mOsm/kg, and therefore it is preferred that the perfusion fluid have an osmolality between 250 mOsm/kg and 350 mOsm/kg to promote optimal perfusion. As the animal's capillary system is specifically designed to allow perfusion of fluids having an osmolality of approximately 250 mOsm/kg, fluids with lower osmolalities will not permit proper perfusion, as the fluids will not perfuse through the walls of the capillaries with the same degree of efficiency as provided with fluids having the desired osmolality. In fact, use of perfusion fluids such as water or wine, which have osmolalities between 0 and 50 mOsm/kg, will result in the endothelium of the capillaries constricting, thus preventing perfusion in the muscles of the animal. On the other hand, use of perfusion fluids such as melted edible fats results in generally poor perfusion, as the melted fat serves only to line the blood vessels with fat, thus increasing the fat content of the meat and thus adding fat flavoring. If melted fats are used, the pressure at which the fat must be injected must be higher than 10 pounds per square inch to force the fats through the circulatory system, which can result in damage to the smaller capillaries. Therefore, in no circumstances should melted fat be used as a perfusant in the present invention.

Therefore, to summarize, it is important that the infusion take place in a closed arterial system by entry to a large central artery or left heart. While it is possible to use the process of the present invention on an already butchered carcass which includes severed extremities, it would not be preferable due to the incomplete circulatory system of the butchered animal. Additionally, the severed extremities cause the circulatory system to have low resistance to fluid flow therethrough, due to the plurality of exit points from the system (i.e. the severed legs or neck). Fluid flow speed is thus increased, fluid pressure decreases, and therefore perfusion efficiency decreases, as the perfusion fluid doesn't pass through the capillary walls into the surrounding tissues. The temperature of the perfusion fluid should be within the physiological body temperature of the animal, which is normally between 90° F. and 105° F. The concentration of the perfusion fluid should approximate or surpass the osmotic and/or oncotic pressure of the extracellular fluid (i.e. the animal's blood). Fluid should be circulated at a pressure of approximately 3–10 pounds per square inch, with the preferred pressure being between 5 and 8 psi. Finally, the perfusion should exchange the entire blood as completely as possible (preferably greater than 97% replacement), and therefore the total volume of perfusion fluid used during the process is preferably more than 10% of the animal's body weight.

When all of the above elements are present during the perfusion process, optimal perfusion takes place, thus resulting in efficiently tenderized and desirably flavored perfused meat product. It is also important to note that many characteristics of the meat product may be easily controlled and/or modified by use of the present invention. These include such characteristics as the salt level of the meat, the health related characteristics of the meat, such as mineral or vitamin content, the desirable pinkish color of the processed meat, the water content of the meat and the desired flavor of the meat. Also, the meat product can be "precooked" by using a perfusion solution heated to a temperature above 160° F., or can be pasteurized by using a heated perfusion fluid with a temperature between 130° to 150° F.

Two further important features of the meat processed by use of the present invention are that during the meat processing, contaminants such as germs and bacteria are flushed from the meat product, thus rendering a meat product generally free of contaminants. The meat product thus need not be irradiated to destroy bacteria, as is presently done. Furthermore, the meat product has a longer shelf life with less stringent temperature requirements than meat product produced not using the present invention. In fact, I have found that unrefrigerated meat packed in a standard airtight plastic wrap will keep for up to three days, whereas refrigerated meat packaged in the usual manner will keep for up to ten days without spoilage. Furthermore, the undesirable "green" color that often forms on spoiling or aging meat is prevented from forming.

The present invention thus provides a substantial improvement over injection techniques found in the prior art. In most cases, flavoring or tenderizing may be accomplished in less than 10 minutes, which allows the process of the present invention to be performed as a step in any meat processing method. Furthermore, as animals need not be held before slaughtering to allow chemicals to be circulated in the animal's body, the need for holding pens, which can take up space and may result in contamination, may be eliminated.

Whereas the process of the present invention has been described with some degree of particularity, it is to be understood that numerous modifications and substitutions to the above described process may be implemented. For example, perfusion fluid may be injected into a large artery instead of the aorta itself. Therefore, the above description is intended in no way to limit the scope of the invention, which shall follow from the claims set forth below.

There has thus been shown and described a process which accomplishes at least all of the stated objectives.

I claim:

1. A process for tenderizing, flavoring, cholesterol or sodium extracting or fat binding of meat through perfusion, said process comprising;

inducing the brain death of a meat-providing animal;

leaving said meat-providing animal substantially intact, thereby leaving the appendages of said animal intact and the circulatory system of said animal generally intact;

accessing said circulatory system of said animal;

providing a fluid-conducting tube having a penetrating end and an opposite end;

providing a perfusion fluid generally free of melted fats and having a physiological osmolality which is at least iso-osmotic with the osmolality of the animal's blood;

connecting a source of said perfusion fluid to said opposite end of said fluid-conducting tube;

inserting said penetrating end of said fluid-conducting tube into the arterial side of the circulatory system of said animal;

heating said perfusion fluid to a temperature of at least 80° F. (26.7° C.);

introducing said fluid into said circulatory system of said animal;

circulating said fluid through said circulatory system of said animal;

replacing at least some of the blood of said animal with said perfusion fluid; and draining most of said blood and said fluid from said circulatory system of said animal from fewer than three exit points in said circulatory system.

2. The process of claim 1 further comprising the step of continuing processing of said animal.

3. The process of claim 1 wherein the step of accessing the circulatory system of said animal comprises opening the chest of said animal, spreading the ribs of said animal, cutting through the pericardium and accessing the heart.

4. The process of claim 3 wherein the step of inserting the penetrating end of said fluid-conducting tube into the arterial side of said circulatory system of said animal comprises inserting said penetrating end into the left side of the heart such that said penetrating end of said fluid-conducting tube may be placed within said heart or in the aorta of said animal.

5. The process of claim 1 wherein the step of accessing the circulatory system of said animal comprises the steps of cleansing the neck of said animal, opening said neck to expose at least one of said animal's carotid arteries and preparing the carotid artery for insertion of said penetrating end of said fluid-conducting tube.

6. The process of claim 5 wherein said step of providing a fluid-conducting tube having a penetrating end and an opposite end further comprises providing a fluid-conducting tube having a cannula-connecting end and an opposite end, and further providing an intra-arterial cannula, said cannula connected to said fluid-conducting tube at said cannula-connecting end.

7. The process of claim 5 wherein the step of inserting said penetrating end of said fluid-conducting tube into the arterial side of said circulatory system of said animal comprises inserting said intra-arterial cannula into one of the animal's carotid arteries such that perfusion fluid may be introduced into one of said carotid arteries.

8. The process of claim 1 wherein said step of heating said perfusion fluid comprises heating said perfusion fluid to a temperature between 90° F. (32.2° C.) and 105° F. (40.6° C.).

9. The process of claim 1 wherein the step of introducing said fluid into said circulatory system of said animal comprises supporting a container of said fluid above said animal such that said fluid may flow into said circulatory system under hydrostatic pressure, thereby displacing at least some of the blood of said animal.

10. The process of claim 1 wherein the step of introducing said fluid into said circulatory system of said animal comprises a fluid pump for forcing said fluid into said circulatory system of said animal under pressure, thereby displacing at least some of the blood of said animal.

11. The process of claim 1 wherein said perfusion fluid comprises an isotonic solution with extracellular fluid whereby use of said isotonic solution may result in sodium displacement.

12. The process of claim 1 wherein said perfusion fluid comprises a flavoring.

13. The process of claim 1 wherein said perfusion fluid comprises a cholesterol or fat binder/extractor.

14. The process of claim 1 wherein said perfusion fluid has an osmolality between 250 mOsm/kg and 350 mOsm/kg thereby promoting perfusion of said perfusion fluid through capillary walls and vessels.

15. The process of claim 1 wherein said perfusion fluid is introduced into said circulatory system at a pressure between 3 and 10 pounds per square inch, thereby preventing damage to smaller blood vessels such as capillaries.

16. The process of claim 1 wherein said step of connecting a source of perfusion fluid to said circulatory system comprises dissecting a major artery and inserting a catheter into the animal's aorta.

17. The process of claim 1 wherein said fluid is circulated through substantially all of the animal's circulatory system.

18. A process for tenderizing, flavoring, cholesterol or sodium extracting or fat binding of meat through perfusion, said process comprising;

selecting a meat-providing animal from the group consisting of cattle, fowl, pigs, lamb, deer and buffalo;

inducing the brain death of said meat-providing animal;

leaving said meat-providing animal-substantially intact, thereby leaving the appendages of said animal intact and the circulatory system of said animal generally intact;

accessing said circulatory system of said animal at a single location;

providing a fluid-conducting tube having a penetrating end and an opposite end;

providing a perfusion fluid generally free of melted fats and having a physiological osmolality which is at least iso-osmotic with the osmolality of the animal's blood;

connecting a source of said perfusion fluid to said opposite end of said fluid-conducting tube;

dissecting a major artery;

inserting said penetrating end of said fluid-conducting tube into said major artery of said meat-providing animal;

heating said perfusion fluid to a temperature of at least 80° F.;

introducing said fluid into said circulatory system of said meat-providing animal;

circulating said fluid through substantially all of said generally intact circulatory system of said meat-providing animal;

replacing at least some of the blood of said animal with said perfusion fluid; and draining most of said blood and said fluid from said circulatory system of said meat-providing animal through a major vein.

19. A process for tenderizing, flavoring, cholesterol or sodium extracting or fat binding of meat through perfusion, said process comprising;

inducing the brain death of a meat-providing animal;

leaving said meat-providing animal substantially intact thereby leaving the appendages of said animal intact and the circulatory system of said animal generally intact;

accessing the circulatory system of said animal by creating an incision in the neck area of said animal, exposing at least one of said animal's carotid arteries and making an incision in at least one of said carotid arteries thereby accessing said circulatory system of said animal;

providing a fluid-conducting tube having a cannula-connecting end and an opposite end;

providing a perfusion fluid generally free of melted fats and having a physiological osmolality which is at least iso-osmotic with the osmolality of the animal's blood;

connecting a source of said perfusion fluid to said opposite end of said fluid-conducting tube;

providing an intra-arterial cannula;

connecting said intra-arterial cannula to said cannula-connecting end of said fluid-conducting tube;

heating said perfusion fluid such that the temperature of said fluid is greater than the body temperature of said animal;

inserting said intra-arterial cannula into one of said carotid arteries such that said cannula is lodged within said carotid artery;

introducing said perfusion fluid into said circulatory system of said animal;

circulating said fluid through substantially all of said generally intact circulatory system of said animal;

replacing at least some of the blood of said animal with said perfusion fluid; and draining most of said blood and said fluid from said circulatory system of said animal from fewer than three exit points.

20. The process of claim 19 wherein said step of leaving said meat-providing animal substantially intact comprises non-removal of viscera, limbs, organs and extensive sections of said circulatory system.

* * * * *